US010566669B2

(12) United States Patent
Johnson (10) Patent No.: US 10,566,669 B2
(45) Date of Patent: Feb. 18, 2020

(54) LITHIUM OXYGEN BATTERIES HAVING A CARBON CLOTH CURRENT COLLECTOR AND METHOD OF PRODUCING SAME

(75) Inventor: Lonnie G. Johnson, Atlanta, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 1044 days.

(21) Appl. No.: 13/247,705

(22) Filed: Sep. 28, 2011

(65) Prior Publication Data
US 2012/0270115 A1 Oct. 25, 2012

Related U.S. Application Data

(63) Continuation-in-part of application No. 11/942,363, filed on Nov. 19, 2007, now abandoned, which is a continuation-in-part of application No. 11/059,942, filed on Feb. 17, 2005, now Pat. No. 7,691,536, application No. 13/247,705, which is a
(Continued)

(51) Int. Cl.
| | |
|---|---|
| *H01M 8/10* | (2016.01) |
| *B32B 37/14* | (2006.01) |
| *H01M 6/18* | (2006.01) |
| *B32B 37/02* | (2006.01) |
| *H01M 4/96* | (2006.01) |

(Continued)

(52) U.S. Cl.
CPC .......... *H01M 12/065* (2013.01); *H01M 4/96* (2013.01); *H01M 6/187* (2013.01); *H01M 2300/0068* (2013.01); *H01M 2300/0082* (2013.01); *H01M 2300/0094* (2013.01); *Y10T 29/49115* (2015.01)

(58) Field of Classification Search
CPC ....... H01M 12/065; H01M 2300/0068; H01M 2300/0082; H01M 2300/0094; H01M 4/96; H01M 6/187; Y02E 60/50; Y10T 29/49115
See application file for complete search history.

(56) References Cited

U.S. PATENT DOCUMENTS

| | | |
|---|---|---|
| 3,237,078 A | 2/1966 | Mallory |
| 3,393,355 A | 7/1968 | Whoriskey et al. |
| | (Continued) | |

FOREIGN PATENT DOCUMENTS

| | | |
|---|---|---|
| EP | 0055855 A2 | 7/1982 |
| EP | 0071271 A2 | 2/1983 |
| | (Continued) | |

OTHER PUBLICATIONS

0168062, EP, Seikisui Chemical Co, dated Jan. 15, 1986.
(Continued)

*Primary Examiner* — Adam A Arciero
(74) *Attorney, Agent, or Firm* — Panitch Schwarze Belisario & Nadel LLP (57) ABSTRACT

A lithium oxygen or air battery (80) is disclosed having two halves (81) that are joined together along their edges. Each battery half (81) has a carbon cloth or mesh cathode current collector (82), a cathode (83), a cathode terminal (84), an anode (85), an anode current collector, anode terminal (88) and a solid separator (87). The cathode includes randomly distributed carbon fibers throughout. The manufacturing of the cathode includes embedding a carbon cloth between two layers of cathode material in a slurry state.

14 Claims, 5 Drawing Sheets

Related U.S. Application Data continuation-in-part of application No. 12/759,681, filed on Apr. 13, 2010, now abandoned.

(60) Provisional application No. 60/546,683, filed on Feb. 20, 2004, provisional application No. 61/212,568, filed on Apr. 13, 2009.

(51) Int. Cl.
  *H01M 8/02* (2016.01)
  *H01M 12/06* (2006.01)

(56) References Cited

U.S. PATENT DOCUMENTS

| | | | |
|---|---|---|---|
| 4,040,410 A | 8/1977 | Libowitz | |
| 4,049,877 A | 9/1977 | Saillant et al. | |
| 4,092,464 A | 5/1978 | Dey et al. | |
| 4,098,958 A | 7/1978 | Bettman | |
| 4,303,877 A | 12/1981 | Meinhold | |
| 4,422,500 A | 12/1983 | Nishizaki et al. | |
| 4,523,635 A | 6/1985 | Nishizaki et al. | |
| 4,562,511 A | 12/1985 | Nishino et al. | |
| 4,591,539 A | 5/1986 | Oltman et al. | |
| 4,614,905 A | 9/1986 | Petersson et al. | |
| 4,654,281 A | 3/1987 | Anderman et al. | |
| 4,677,038 A | 6/1987 | Salomon | |
| 4,692,390 A | 9/1987 | Roy | |
| 4,719,401 A | 1/1988 | Altmejd | |
| 4,791,029 A | 12/1988 | Fau et al. | |
| 4,818,638 A | 4/1989 | Roy | |
| 5,139,895 A | 8/1992 | Roy et al. | |
| 5,270,635 A | 12/1993 | Hoffman et al. | |
| 5,291,116 A | 3/1994 | Feldstein | |
| 5,296,318 A | 3/1994 | Gozdz et al. | |
| 5,306,577 A | 4/1994 | Sprouse | |
| 5,314,765 A | 5/1994 | Bates | |
| 5,336,573 A | 8/1994 | Zuckerbrod et al. | |
| 5,338,625 A | 8/1994 | Bates et al. | |
| 5,362,581 A | 11/1994 | Chang et al. | |
| 5,387,857 A | 2/1995 | Honda et al. | |
| 5,411,592 A | 5/1995 | Ovshinsky et al. | |
| 5,436,091 A | 7/1995 | Shackle et al. | |
| 5,445,906 A | 8/1995 | Hobson et al. | |
| 5,455,126 A | 10/1995 | Bates et al. | |
| 5,456,000 A | 10/1995 | Gozdz et al. | |
| 5,498,489 A | 3/1996 | Dasgupta et al. | |
| 5,510,209 A | 4/1996 | Abraham et al. | |
| 5,512,147 A | 4/1996 | Bates et al. | |
| 5,532,074 A | 7/1996 | Golben | |
| 5,540,741 A | 7/1996 | Gozdz et al. | |
| 5,547,782 A | 8/1996 | Dasgupta et al. | |
| 5,561,004 A | 10/1996 | Bates et al. | |
| 5,567,210 A | 10/1996 | Bates et al. | |
| 5,569,520 A | 10/1996 | Bates | |
| 5,571,634 A | 11/1996 | Gozdz et al. | |
| 5,584,893 A | 12/1996 | Mitchell | |
| 5,588,971 A | 12/1996 | Fauteux et al. | |
| 5,591,544 A | 1/1997 | Fauteux et al. | |
| 5,597,659 A | 1/1997 | Morigaki et al. | |
| 5,597,660 A | 1/1997 | Bates et al. | |
| 5,612,152 A | 3/1997 | Bates | |
| 5,654,084 A | 8/1997 | Egert | |
| 5,778,515 A | 7/1998 | Menon | |
| 5,783,928 A | 7/1998 | Okamura | |
| 5,811,205 A | 9/1998 | Andrieu et al. | |
| 5,821,733 A | 10/1998 | Turnbull | |
| 5,928,436 A | 7/1999 | Borkowski et al. | |
| 6,001,139 A | 12/1999 | Asanuma et al. | |
| 6,004,691 A * | 12/1999 | Eshraghi | 429/133 |
| 6,033,796 A | 3/2000 | Baji | |
| 6,168,884 B1 | 1/2001 | Neudecker et al. | |
| 6,387,563 B1 | 5/2002 | Bates | |
| 6,413,285 B1 | 7/2002 | Chu et al. | |
| 6,558,848 B1 * | 5/2003 | Kobayashi | H01M 4/661 429/233 |
| 6,631,073 B1 * | 10/2003 | Sakata | H01G 11/34 361/303 |
| 6,709,778 B2 | 3/2004 | Johnson | |
| 6,737,180 B2 | 5/2004 | Johnson | |
| 6,955,866 B2 * | 10/2005 | Nimon et al. | 429/231.95 |
| 7,147,967 B1 | 12/2006 | Read | |
| 7,282,295 B2 | 10/2007 | Visco et al. | |
| 7,670,724 B1 | 3/2010 | Chan et al. | |
| 2002/0098407 A1 | 7/2002 | Kunisa et al. | |
| 2003/0068282 A1 * | 4/2003 | Green et al. | 424/49 |
| 2003/0157396 A1 | 8/2003 | Beckmann et al. | |
| 2004/0126653 A1 | 7/2004 | Visco et al. | |
| 2005/0095506 A1 | 5/2005 | Klaassen | |
| 2005/0100793 A1 | 5/2005 | Jonghe et al. | |
| 2005/0112458 A1 * | 5/2005 | Dopp | H01M 2/02 429/174 |
| 2005/0208353 A1 | 9/2005 | Johnson | |
| 2006/0063051 A1 | 3/2006 | Jang | |
| 2007/0015060 A1 * | 1/2007 | Klaassen | H01B 1/122 429/309 |
| 2007/0221265 A1 | 9/2007 | Affinito et al. | |
| 2008/0070087 A1 | 3/2008 | Johnson | |
| 2008/0241664 A1 * | 10/2008 | Nanjundaswamy et al. | 429/128 |
| 2009/0169962 A1 | 7/2009 | Hsing et al. | |
| 2011/0091777 A1 * | 4/2011 | Mizuno | H01M 4/131 429/403 |

FOREIGN PATENT DOCUMENTS

| | | | | |
|---|---|---|---|---|
| EP | | 0168062 A2 | 1/1986 | |
| JP | WO | 2010073332 A1 * | 7/2010 | H01M 4/131 |

OTHER PUBLICATIONS

0055855, EP, Seikisui Chemical Co, dated Jul. 14, 1982.
0071271, EP, Seikisui Chemical Co, dated Feb. 9, 1983.
Fragnaud et al., "Characterization of sprayed and sputter deposited LiCoO2 thin films for rechargeable microbatteries," Journal of Power Sources, vol. 63, pp. 187-191 (1996) (Abstract Only).
Wang et al., "Characterization of Thin-Film Rechargeable Lithium Batteries with Lithium Cobalt Oxide Cathodes," J. Electrochem. Soc., vol. 143, No. 10, pp. 3203-3213 (1996) (Abstract Only).
Fragnaud et al., "Thin-film cathodes for secondary lithium batteries," Journal of Power Sources, vol. 54, pp. 362-366 (1995) (Abstract Only).
Kenny et al., "The preparation and characterization of lithium cobalt oxide thin films by LPCVD," Symposium BB-Metal-Organic Chemical Vapor Deposition of Electronic Ceramics II, vol. 415, pp. 213-217 (1996) (Abstract Only).
Schoonman et al., "Thin film solid electrolytes and electrodes for rechargeable lithium-ion batteries," Journal of Power Sources, vol. 68, pp. 65-68 (1997) (Abstract Only).
Chen et al., "Fabrication of LiCoO2 thin film cathodes for rechargeable lithium battery by electrostatic spray pyrolysis," Solid State Ionics, vol. 80, pp. 1-4 (1995) (Abstract Only).
Chen et al., "Unique porous LiCoO2 thin layers prepared by electrostatic spray deposition," Journal of Material Science, vol. 31, pp. 5437-5442 (1996) (Abstract Only).
Cole, "Thermoelectric Energy Conversion with Solid Electrolytes," Science, vol. 221, pp. 915-920 (Sep. 2, 1983) (Abstract Only).
Read, J., "Characterization of the Lithium/Oxygen Organic Electrolyte Battery," Journal of The Electrochemical Society, vol. 149, No. 9, pp. A1190-A1195 (2002) (Abstract Only).
Read et al., "Oxygen Transport Properties of Organic Electrolytes and Performance of Lithium/Oxygen Battery," Journal of the Electrochemical Society, vol. 150, No. 10, pp. A1351-A1356 (2003).
Ogasawara et al., "Rechargeable Li2O2 Electrode for Lithium Batteries," Journal of American Chemical Society, vol. 128, No. 4, pp. 1390-1393 (2006) (Abstract Only).
Aurbach et al., "Vinylene Carbonate and Li Salicylatoborate as Additives in LiPF3 (CF2CF3)3 Solutions for Rechargeable Li-Ion Batteries," Journal of The Electrochemical Society, vol. 151, No. 1, pp. A23-A30 (2004) (Abstract Only).

(56) References Cited

OTHER PUBLICATIONS

Littauer et al., "Corrosion of Lithium in Alkaline Solution," Journal of Electrochemical Society, vol. 124, No. 6, pp. 850-855 (1977) (Abstract Only).

Tarascon et al., "Performance of Bellcore's plastic rechargeable Li-ion batteries," Solid State Ionics, vols. 86-88, Part 1, pp. 49-54 (1996) (Abstract Only).

International Search Report dated Feb. 22, 2013 in International Application No. PCT/US2012/057748.

International Preliminary Report on Patentability dated Apr. 1, 2014 in International Application No. PCT/US2012/057748.

Dobley et al., "Non-aqueous Lithium-Air Batteries with an Advanced Cathode Structure," Proceedings on the 41st Power Sources Conference, 3 pages (2004).

Office Action dated Apr. 7, 2009 in U.S. Appl. No. 11/059,942, by Johnson.

Office Action dated Oct. 22, 2009 in U.S. Appl. No. 11/059,942, by Johnson.

Office Action dated Jun. 22, 2009 in U.S. Appl. No. 11/648,117, by Johnson.

Office Action dated Jun. 28, 2012 in U.S. Appl. No. 11/942,363, by Johnson.

Office Action dated Jul. 3, 2008 in U.S. Appl. No. 11/684,117, by Johnson.

Office Action dated Aug. 9, 2013 in U.S. Appl. No. 13/687,439, by Johnson.

Office Action dated Aug. 29, 2012 in U.S. Appl. No. 12/759,681, by Johnson.

Office Action dated Sep. 30, 2009 in U.S. Appl. No. 11/684,117, by Johnson.

Office Action dated Nov. 13, 2012 in U.S. Appl. No. 11/942,363, by Johnson.

Office Action dated Dec. 16, 2011 in U.S. Appl. No. 11/942,363, by Johnson.

Abraham et al., "Highly Conductive PEO-like Polymer Electrolytes," Chem. Mater., vol. 9, pp. 1978-1988 (1997) (Abstract Only).

Feldman et al., "Heat pumps using organometallic liquid absorbents," AES, vol. 38, pp. 403-407 (1998).

Hamlen et al., Chapter 38 from D. Linden et al. Handbook of Batteries, 3rd ed., Metal/Air Batteries, 38. 1-38.53, McGraw Hill, New York (2002).

Oxidation-Reduction Reactions; pp. 417-420 (Dec. 1999).

Visco et al., "Lithium Fuel Cells," vol. 27, Proceedings of the 12th International Meeting on Lithium Batteries, The Electrochemical Society, Inc. (2004).

Dobley et al., "Non-aqueous Lithium-Air Batteries with an Advanced Cathode Structure," Proceedings of the 41st Power Sources Conference, 3 pages (2004).

Chen et al., "Unique porous LiCoO2 thin layers prepared by electrostatic spray deposition," Journal of Material Science, vol. 31, pp. 5437-5442 (1996) (Abstract Only) (Previously Cited).

Cole, "Thermoelectric Energy Conversion with Solid Electrolytes," Science, vol. 221, pp. 915-920 (Sep. 2, 1983) (Abstract Only) (Previously Cited).

Ogasawara et al., "Rechargeable Li2O2 Electrode for Lithium Batteries," Journal of American Chemical Society, vol. 128, No. 4, pp. 1390-1393 (2006) (Abstract Only) (Previously Cited).

\* cited by examiner

LITHIUM OXYGEN BATTERIES HAVING A CARBON CLOTH CURRENT COLLECTOR AND METHOD OF PRODUCING SAME

REFERENCE TO RELATED APPLICATION

This is a continuation-in-part of U.S. patent application Ser. No. 11/942,363 filed Nov. 19, 2007 and titled Non-Volatile Cathodes For Lithium Oxygen Batteries And Method Of Producing Same, which is a continuation-in-part of U.S. patent application Ser. No. 11/059,942 filed Feb. 17, 2005 and titled Lithium Oxygen Batteries and Method of Producing Same which claims priority to U.S. Patent Application Ser. No. 60/546,684 filed Feb. 20, 2004 and titled Lithium Air Battery Technology, and a continuation-in-part of U.S. patent application Ser. No. 12/759,681 filed Apr. 13, 2010 and titled Lithium Oxygen Battery Having Enhanced Anode Environment.

TECHNICAL FIELD

This invention relates generally to batteries, and more particularly to lithium oxygen batteries and methods of manufacturing lithium oxygen batteries.

BACKGROUND OF THE INVENTION

Batteries have existed for many years. Recently lithium oxygen or lithium air batteries have been researched as a power supply. These lithium batteries have utilized a polymer based electrolyte positioned between the cathode and anode. Batteries using these polymer electrolytes however quickly degrade when exposed to ambient air due to the fact that they 1) do not provide adequate moisture barrier protection for the lithium anode and thus the lithium anode reacts with moisture and quickly degrades and 2) they employ electrolyte in the cathode that is volatile and very unstable in ambient air resulting cathode dry out and or reactions with ambient air gasses resulting in degraded performance.

These batteries typically utilize an aluminum cathode current collector. However, the use of aluminum as the current collector requires an electrolyte that can passivate the aluminum surface to reduce corrosion. Typically, these batteries utilize an electrolyte salt such as lithium hexafluorophosphate ($LiPF_6$) to passivate the aluminum. However, $LiPF_6$ should not be utilized in an environment in which oxygen or water is present, thus making it unacceptable for use with Lithium oxygen or air batteries, as it is known to hydrolyze for form HF, which attacks any metal oxides commonly used as oxygen redox catalysts. It is also believed that the $PF_6$ breaks down in this environment which likely contributes to the capacity fade of the battery.

An additional problem with aluminum current collectors stems from the fact that they make up a significant portion of the weight in an air cathode of a lithium air or lithium oxygen battery. This results in a lower overall specific energy density for the battery cell.

It thus is seen that a need remains for an electrolyte for a lithium air battery which overcomes problems associated with those of the prior art. Accordingly, it is to the provision of such that the present invention is primarily directed.

SUMMARY OF THE INVENTION

A lithium oxygen battery comprises an oxygen cathode containing a non-volatile lithium ion conductive electrolyte, an anode, and a non-volatile, solid moisture barrier electrolyte disposed between the cathode and the anode.

DETAILED DESCRIPTION

Figure 1:
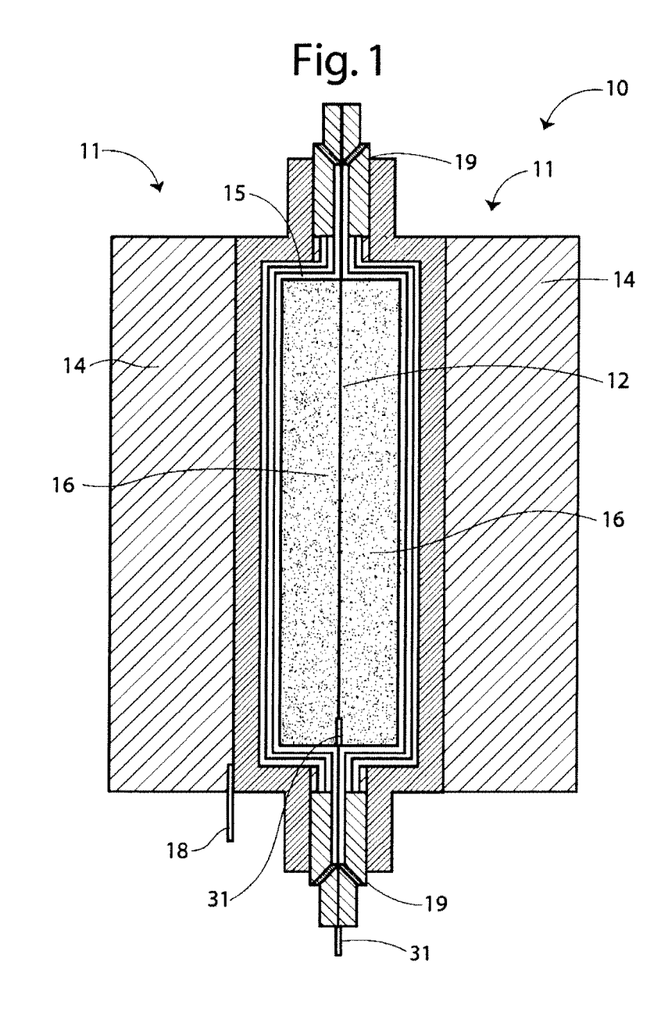
FIGS. 1-5 are a sequential series of cross-sectional views of the manufacturing process of a lithium air battery embodying principles of the invention in a preferred form.

With reference next to the drawings, there is shown in a lithium air or lithium oxygen battery 10 embodying principles of the invention in a preferred form. The battery 10 is essentially two equal halves 11 that are joined together along a centerline 12. Each half 11 includes a substrate 13, a carbon-based cathode 14, a solid electrolyte 15, an anode 16, a cathode current collector 17, a cathode terminal 18, an anode terminal 31, and edge seals 19. The terms lithium air and lithium oxygen batteries should be understood to be used interchangeably herein.

The substrate 13 includes an electrically conductive fiber matrix material 20, such as that made of compressed, random carbon fibers, which will be described in more detail hereinafter. The substrate 13 has a material thickness of approximately 3 to 4 mils.

The solid electrolyte 15 is comprised of alternating layers of glass 21 and polymer 22 materials. The glass layer 21 is an ion conductive glass, such a LiPON (lithium phosphorus oxynitride, $Li_xPO_yN_z$). The polymer layer 22 is an ion conductive polymer or polymer electrolyte such as polyethylene oxide (PEO), which includes a lithium salt or the like. The polymer layer 22 has a thickness of approximately 5 microns.

The anode 16 is made of a lithium metal with a thickness of approximately 100 microns.

Figure 2:
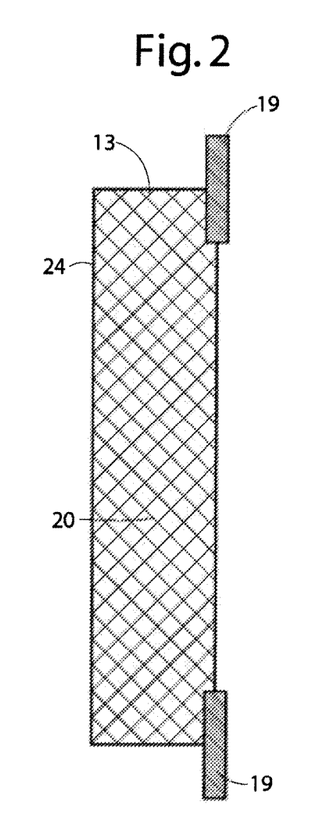

To manufacture the battery 10 the fiber matrix material 20 is laminated with polymer electrolyte membrane 24. An example membrane is a solvent cured film of polyvinylidene difluoride (PVDF) with dibutyl adipate (DBA). This produces a dimensionally stabilized substrate 13 with one side having the carbon fibers exposed and with the opposite side having the film material exposed, as shown in FIG. 2. The film material also fills the majority of the spaces between the fibers within the matrix material 20. Heat sealable polymer strips or edge seals 19 are then laminated to and beyond the peripheral edges of the substrate 13, thereby forming a picture frame like border about the substrate, as shown in FIG. 2.

Figure 3:
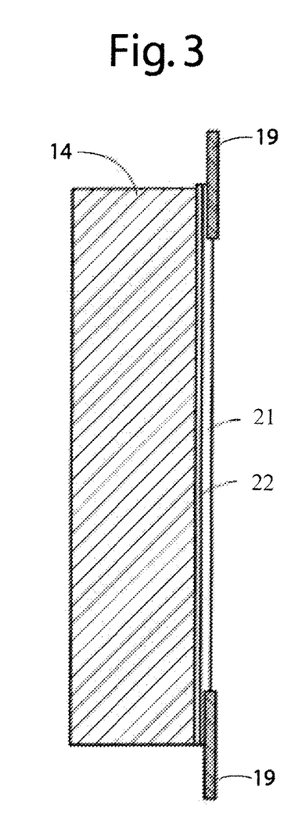

Next, the cathode 14 is formed by casting a slurry of solvent curable cathode material made of a combination of solvent such as acetone, carbon, polyvinylidene difluoride (PVDF) and dibutyl adipate (DBA) plasticizer upon the substrate 13. The slurry is cast upon the side of the substrate with solvent cured film 24 exposed, as shown in FIG. 3. Alternatively, the slurry may be cast onto a table and allowed to cure. The resulting cathode material is then laminated onto substrate.

The solid electrolyte 15 is then joined to the substrate 13 opposite the cathode 14. The formation of the electrolyte 15 commences with the deposition of an initial layer of electrolyte coating. The initial layer may be solid electrolyte or polymer electrolyte. If, for example, the polymer electrolyte layer 22 is first, it may be polyethylene oxide (PEO) containing lithium salt. The polymer layer 22 may be a cast layer of approximately 5 mils in thickness in order to create a smooth surface.

Next a solid electrolyte 21, such as LiPON, may be sputtered onto the polymer layer in conventional fashion.

The partially constructed cell is next submerged in a series of ether, methanol or similar baths to remove the DBA plasticizer from the cathode and substrate. This results in a porous cathode 14 while the first coating of polymer layer 22 and glass layer 21 remain non-porous.

Figure 4:
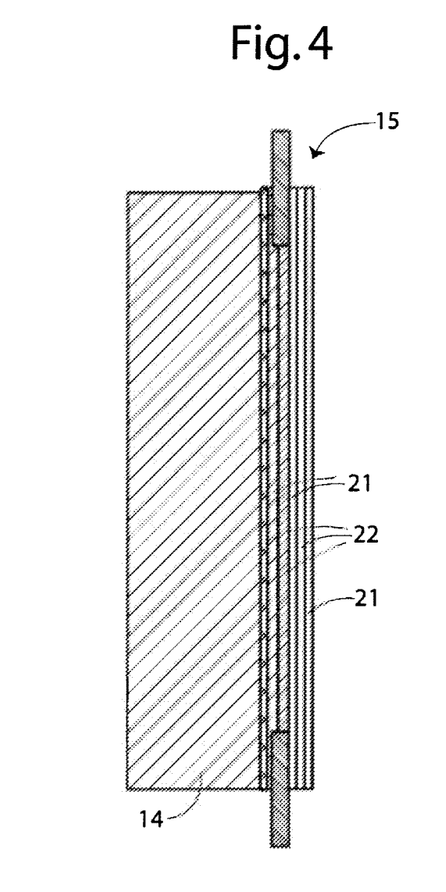

In either case, additional, alternating series of polymer layers 22 and glass layers 21 may then be deposited to form a stack of polymer and glass layers, as shown in FIG. 4. The number and thickness of the layers depend upon the use and desired operational parameters of the battery. However, while one layer of each material would work as an electrolyte, it is believed that by having at least two layers of each material the formation of any pinholes in one glass layer will not line up with pinholes in a subsequent glass layer, thus a performance degrading pinhole does not extend completely through the entire electrolyte thereby limiting the damaging effect of such.

Figure 5:
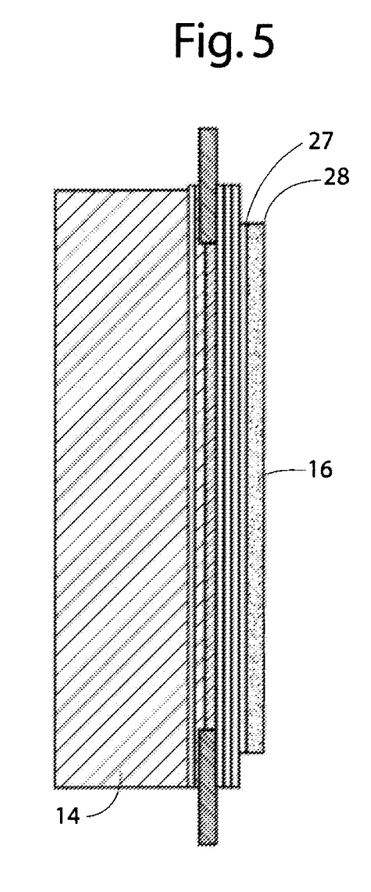

An approximately 2 micron thick layer of lithium metal 27 is then vapor deposited upon the top layer of the solid electrolyte 15. A thicker layer of lithium metal foil 28, approximately 100 microns in thickness, is then laminated to the thin layer 27, as shown in FIG. 5. The lithium foil includes a metal tab made of copper or nickel extending therefrom to form an anode terminal 31. It should be understood that the time, temperature and pressure of the lamination process should be selected so that the lithium foil 28 is laminated to the thin layer of lithium metal 27, but also such that the pores within the substrate 13 do not close. It is believed that a temperature of approximately 100 degrees Celsius and pressure of approximately 0.5 p.s.i. for a period of 10 to 20 minutes should accomplish this task. This step completes the construction process of one half 11 of the battery 10.

To complete that battery 10 two similarly constructed halves 11 are positioned against each other anode 16 to anode 16 along centerline 12 with the terminal 31 positioned therebetween along one peripheral edge, as shown in FIG. 1. The two halves 11 are then laminated to each other in a similar manner as previously described with regard to the lamination of the lithium foil 28. Heat sealable polymer strips 25 are sealed to each other, thereby sealing the exposed side edges of the anode 16 and solid electrolyte 15. The sealing of the side edges limits moisture from entering the cell through the side edges. Note that the edge sealant bonds to and seals across the anode terminal as well.

A measured mount of liquid electrolyte is then applied to the cathodes 14. The liquid electrolyte may be one mole of LiTFSI [Lithium bis(trifluoromethansulfonyl)imide] in 1-Ethyl-3-methylimidazolium bis(trifluoromethylsulfonyl) imide (EMIMBMeI); one mole of LiTFSI [Lithium his (trifluoromethansulfonyl)imide] in 1-Ethyl-3-methylimidazolium bis(pentafluoroethylsulfonyl)imide (EMIMBeTi); or a mixture of LiTFSI [Lithium his (trifluoromethansulfonyl) imide] and Acetamide in 1:4 molar ratio. The liquid electrolyte fills the smaller pores within the cathode.

It should be understood that if a non-conductive matrix is utilized as an alternative to the conductive matrix of the preferred embodiment, the battery cell may includes an additional current collector, such as a conductive mesh, between the substrate 13 and the cathode 14. It should also be understood that porous metal material including porous metal foils could be suitable for use as a conductive matrix/ substrate.

The just described invention creates a lithium air battery with an electrolyte system that provides excellent barrier protection of the lithium anode from moisture. The overall barrier is pinhole free and is not brittle. It should be understood that as used herein the term deposited is intended to encompass all known methods of depositing layers, such as by chemical evaporation, thermal evaporation, sputtering, laser ablation or other conventionally known methods. It should also be understood that while the preferred embodiment shows a battery made of two halves, each half may be considered a complete battery. Obviously, this formation would require additional sealing of the battery components.

Figure 6:
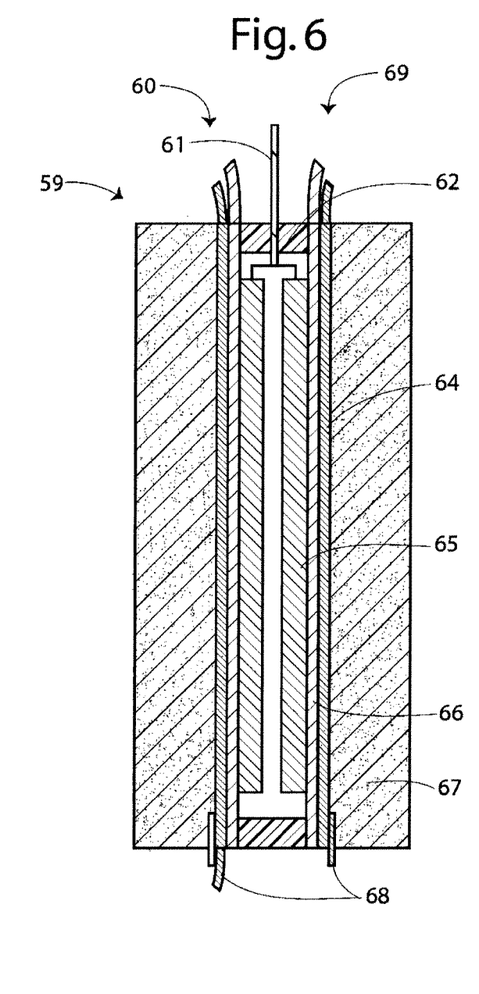
FIG. 6 is a cross-sectional view of a lithium air battery in another preferred form of the invention.

With reference next to FIG. 6, there is shown in a lithium air or lithium oxygen battery 59 embodying principles of the invention in another preferred form. The lithium oxygen battery 59 has an oxygen cathode 67, an anode 65, and a protective barrier solid electrolyte 66 disposed between the cathode 67 and the anode 65. The battery may or may not include a protective barrier separator layer for the anode 65. The cathode 67 includes a non-volatile (low evaporation pressure) lithium ion-conductive electrolyte such as polyethylene oxide (PEO) containing lithium salt. A typical electrolyte in-situ preparation method is described as follows. PEO and lithium tetrafluoborate ($LiCF_3SO_3$) are dissolved in acetonitrile at elevated temperature with an O/Li ratio of 20:1. An appropriate amounts of conductive agent and of nano-sized inorganic filler (such as fumed silica) are added to the solution. The mixture is stirred and subsequently cast on to glass. The solvent is then allowed to evaporate at room temperature. The electrolyte film is further dried under vacuum for 1 day. Super P carbon black is used as the conductive agent in the air cathode.

Super P carbon black containing cobalt catalyst is prepared as follows: a specified amount of cobalt phthalocyanine is dissolved in concentrated sulfuric acid. The resulting product is mixed with Super P carbon black to form a wet paste. After adding water, cobalt phthalocyanine is precipitated and deposited in the Super P carbon matrix. The resulting product is filtered and washed with distilled water to reach neutral ph. The mixture is then dried and heated to 800° C. under a flowing argon atmosphere to yield the desired carbon-catalyst composite material.

The carbon-catalyst mixture is prepared in a 20:80 by weight percent mixture with the previously described polymer electrolyte (PEO) formulation to form the cathode material.

The same electrolyte that is employed as a binder in the air electrode is used to form the polymer electrolyte separator layer. The lithium anode, PEO separator, and composite cathode layers are cast separately and allowed to dry. The resulting films are heat laminated together at 60° C. If included, protective electrolyte barrier 66 would be coated on to polymer electrolyte separator layer 64 prior to laminating the anode, separator and cathode layers together. The completed cell may be packaged in a blue multilayer metal polymer enclosure having an air port on the cathode side.

Another approach is to from a ceramic/polymer electrolyte composite structure as a substrate film onto which the remaining battery components can be applied. Nano-porous anodized aluminum is used as a support layer for a cathode, a protective electrolyte glass barrier and a lithium anode. The nano-porous anodized aluminum has the material properties needed to survive high temperature vacuum environments experienced during glass electrolyte sputtering and lithium evaporation processes. The nano-porous aluminum oxide is also compatible with liquid electrolyte formulations used in lithium cells. The anode is coated directly onto one side of the nano-porous substrate. A solid electrolyte barrier is coated onto the opposite side. A layer of bonding material is then applied on top of the electrolyte along the edge of the substrate. Finally a coating of lithium is applied on top of the glass electrolyte to complete the construction of a half cell. Anode current collector leads are then connected to the anode. Two such cells are then bonded back to back to complete construction of the cell sealing the lithium inside with the current collector lead extending across the bond line.

Still another approach may be used to cast the air cathode for use as a substrate, which was discovered through an investigation conducted regarding coating separator material onto cathode wafers as well as coating cathode material on to pre-cast separators. PEO based air cathodes are cast onto glass and allowed to dry. The air electrode is cast with sufficient thickness and structural integrity to act as a substrate onto which the remaining components of the cell can be assembled. The solid electrolyte barrier can be deposited directly on to the cathode in this configuration. On the other hand, casting the polymer separator for use as a substrate was also examined. After casting and drying, the polymer separator is spray coated on one side with cathode material. The process is adjusted such that the droplets of cathode material is partially dry during transient so that they bond with each other and the substrate on contact but still maintain a relatively spherical shape. This process significantly improved the porosity of the cathode material and thereby improved the discharge rate capability.

Whereas the previously described construction methods were based on the use of separator or cathode components as a substrate in starting the cell construction process, the following describes approaches for using the anode as the starting substrate. The battery formation is described in more detail hereinafter.

A lithium anode is initially formed using lithium foil having an anode current terminal tab attached. A coating of glass electrolyte may optionally be applied to both sides of the lithium anode to form a protective barrier against moisture. The coating extends onto a portion of the current collector tab. Cathode and electrolyte layers are solvent-cast separately and then thermally laminated together after being allowed to dry. The individual layers are thermally calendared by passing them through the laminator to smooth their surfaces and reduce the likelihood of penetration of an adjacent layer due the presence of bumps and imperfections. After the cathode and electrolyte are laminated together, two such cathode and electrolyte pairs are positioned back to back with the lithium anode foil in between with each electrolyte layer facing the anode. The stack is then thermally laminated together with the polymer electrolyte bonding to the solid electrolyte separator coating on the lithium foil anode. The cathode and separator layers are larger in area than the anode such that they bond to each other along the edge sealing the lithium anode inside.

The current cell is considered a bipolar laminated cells that is formed by thermally laminating electrolyte separator material on both sides of a piece of lithium foil. The separator material extends beyond the edges of the lithium and completely enclosed it. The cathode material is laminated on top of the separator on both sides of the anode. The sizes of the cathodes are such that they extended beyond the edge of the anode-separator structure to achieve electrical contact with each other except in the vicinity of the anode terminal. This approach offers an expedient assembly process compared with those of other configurations.

An alternate procedure has been developed for bonding the cathode and separator together and then onto the LiPON coated lithium anode in order to avoid the thermal lamination procedure which may damage the LiPON. Each pair of cathode and separator films are cast separately and then thermally laminated to each other. Then a thin coating of PEO or other polymer electrolyte solution is applied on top of the LiPON-covered lithium and allowed to partially dry until it becomes "tacky". This is done so that the polymer electrolyte coating on the LiPON can function as an ionic conductive "glue" to bond the anode to the separator-cathodes. Finally two cathode-separator are placed on opposite sides of the PEO electrolyte and LiPON-coated anode and gently pressed in place to form a bond to complete the construction of the battery.

As an alternative for constructing an anode substrate, lithium is coated or bonded onto a separate substrate material as opposed to using a standalone lithium foil. Polyimide film such Kapton™ is a good example of a thin light weight material used to improve the structural properties the anode. Kapton™ is a polyimide film manufactured under registered trademark of E.I. DuPont De Nemours and Company Corp. The substrates are first coated with an optional layer of LiPON and then with copper. The intent of the LiPON layer is to provide a barrier to prevent any lithium that may diffused along grain boundaries of the copper from being attacked by moisture from the underlying Kapton™ polymer. The copper is then coated with lithium followed by a layer of LiPON. In the final construction step, a coating of PEO electrolyte is applied on top of the LiPON to act as a bonding layer. The bonding layer is allowed to tacky-dry before the separator cathode preassembly is pressed in place on top of the anode.

Another method for constructing the cell is to coat the polymer electrolyte separator and cathode materials sequentially, one on top of the other directly on the glass electrolyte coated lithium anode. A drying period is allowed between casting events to insure the integrity of each layer.

Still another method is to rely on the glass electrolyte layer as a sole separator and to cast the polymer based cathode directly thereon.

With reference specifically to the embodiment shown in FIG. 6, there is shown an embodiment which utilizes porous substrates 64. Each of cell halves 60 and 69 consist of a substrates 64 having one side with a surface coating of protective glass or ceramic electrolyte 66. The glass electrolyte 66 covers the pores of substrate 64, sealing substrate 64 and thereby forms a protective barrier. Lithium anodes 65 are coated on top of the glass electrolyte 66. Composite cathodes 67 are bonded to the opposite side of porous substrates 64. The two cell halves are configured back to back with edge sealant 62 bonding them together.

This configuration forms a hermetic enclosure to protect the anodes from the ambient environment which may include water and water vapor. Liquid electrolyte is placed in the cathodes 67. The liquid electrolyte soaks through out the cathode 67 and into the pores of substrates 64. The liquid soaks through the pores of substrate 64 because of capillary force. The liquid electrolyte makes contact with the ionic conductive glass coating on the opposite side such that the ionic conductive continuity is achieved between the anode and cathode. When current is drawn from the cell, lithium ions are conducted to the cathode where they react with oxygen or other cathode reactive material.

Cathode 67 may be formed using a polymer with carbon powder to form a composite structure. A solvent based polymer such as polyvinylidene difluoride (PVDF) with dibutyl adipate (DBA) is suitable for this purpose.

The cathode 67 is formed by casting a slurry of cathode material made of a combination of carbon, polyvinylidene difluoride (PVDF) and dibutyl adipate (DBA) plasticizer upon a casting surface. Before the slurry is allowed to dry, porous substrate 64 is laid on top of the casting. Dissolved polymer migrates into the pores of substrate 64 due to capillary action. With drying the polymer that extends into the pores of substrate 64 forms a physical bond between the two layers.

The partially constructed cell is then submerged in a series of ether, methanol or similar baths and lithium salts to remove the DBA plasticizer from the polymer bonding material. This process yields a porous cathode 67 bonded to porous substrate 64.

At this point the glass electrolyte surface of two such half cells (60 and 69) can be coated with lithium and bonded back to back to form a hermetic seal to protect the lithium. A measured mount of room temperature eutectic molten salt liquid electrolyte is then applied to the cathodes 14. This class of electrolytes has very low vapor pressure and are not subject to evaporate and thereby leave the cathode dry and inactive. Example room temperature molten salts include: 1) one mole of LiTFSI [Lithium bis(trifluoromethansulfonyl) imide] in 1-Ethyl-3-methylimidazolium bis(trifluoromethylsulfonyl)imide (EMIMBMeI); 2) one mole of LiTFSI [Lithium bis(trifluoromethansulfonyl)imide] in 1-Ethyl-3-methylimidazolium bis(pentafluoroethylsulfonyl)imide (EMIMBeTi); or 3) a mixture of LiTFSI [Lithium bis (trifluoromethansulfonyl)imide] and Acetamide in 1:4 molar ratio. These molten salts have extremely low vapor pressure and therefore can remain in a liquid state within the cathode for an extended period of time with out the cathode drying out. As such, it forms a non-volatile liquid/polymer gel like electrolyte system.

Figure 7:
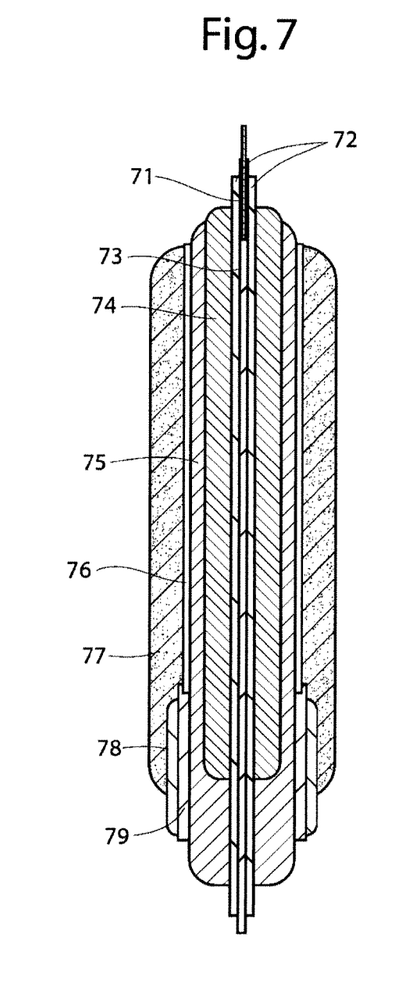
FIG. 7 is a cross-sectional view of a lithium air battery in yet another preferred form of the invention.

FIG. 7 shows an alternate embodiment in a preferred form, wherein a non-volatile solid polymer electrolyte is used to form the cathode. The cell is configured having a polymer substrate 71 coated on either side with copper anode terminals 72. Terminals 72 may be extended to cover most of the surface of the polymer substrate to also function as anode current collectors, 73.

Kapton™ is a suitable polymer material that may be utilized as the substrate. Lithium anodes 74 are coated onto selected areas on opposite sides of the substrate/current collector structure. The lithium anodes are coated with protective ceramic or glass electrolyte 75. A polymer composite cathode material 77 is bonded to the surface of the protective electrolyte coating. The cathode material may form a self bonding interface directly with the glass electrolyte coating or a separate polymer electrolyte bonding layer 76 may be used. Cathode terminals 78 are positioned in electrical contact with the cathodes 77. The cathode terminals 78 may optionally extend across the entire cathode structure so as to function as a cathode current collector. Lithium ion conductive continuity between the anode and cathode is provided by the protective glass electrolyte or the glass electrolyte and polymer electrolyte combination. When current is drawn from the cell, lithium ions are conducted to the cathode where they react with oxygen or other cathode reactive material.

The cathode and optional polymer bonding layer includes a non-volatile (low evaporation pressure) lithium ion-conductive electrolyte comprised of polyethylene oxide (PEO) with lithium salt dissolved therein. A typical electrolyte in-situ preparation method is described as follows.

PEO and lithium tetrafluoborate ($LiCF_3SO_3$) are dissolved in acetonitrile at elevated temperature with an O/Li ratio of 20:1. An appropriate amount of nano-sized inorganic filler (such as fumed silica) is added to the solution. The inorganic filler enhances dimensional stability and improves ionic conductivity of the polymer material after the material is cured. The cathode is formed by mixing carbon, PEO, solvent, electrolyte salt and fumed silica. The resulting slurry can be cast directly on to the surface of glass electrolyte 75. Alternatively, the slurry can be cast on to a casting surface and allowed to dry. After drying the cathode material can be bonded to the surface of the glass electrolyte using a solvent based polymer electrolyte or other suitable material.

The just described invention creates a lithium air battery with an electrolyte system that provides excellent barrier protection of the lithium anode from moisture. It should be understood that as used herein the term deposited is intended to encompass all known methods of depositing layers, such as by chemical evaporation, thermal evaporation, sputtering, laser ablation, sol gel or other conventionally known methods. It should also be understood that while the preferred embodiment shows a battery made of two halves, each half may be considered a complete battery cell. Obviously, a single cell half would require additional sealing of the battery components particularly the anode.

Figure 8:
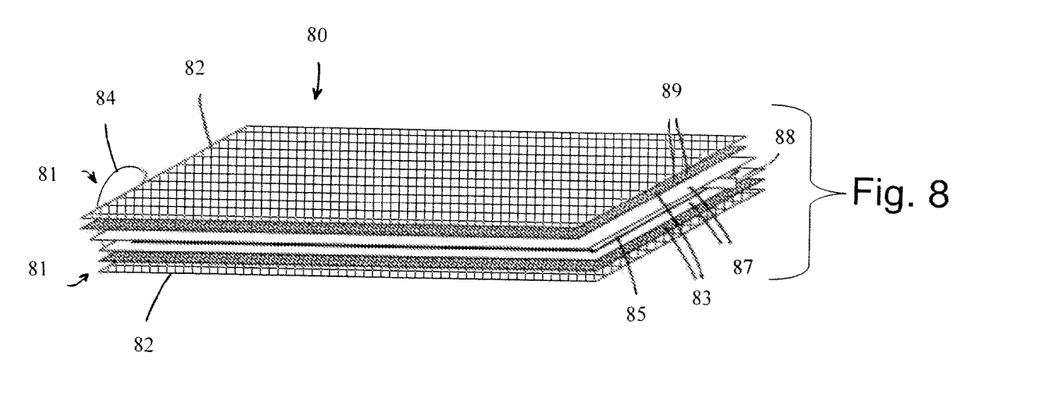
FIG. 8. is a perspective view of a battery in another preferred form of the invention.

With reference next to FIG. 8, there is a shown a lithium oxygen or air battery 80 in another preferred form of the invention. The battery 80 includes two halves 81 that are joined together along their edges. Each battery half 81 has a carbon cloth or mesh cathode current collector 82, a cathode 83, a cathode terminal 84, an anode 85, an anode current collector and anode terminal 88 and a solid separator 87.

Figure 9:
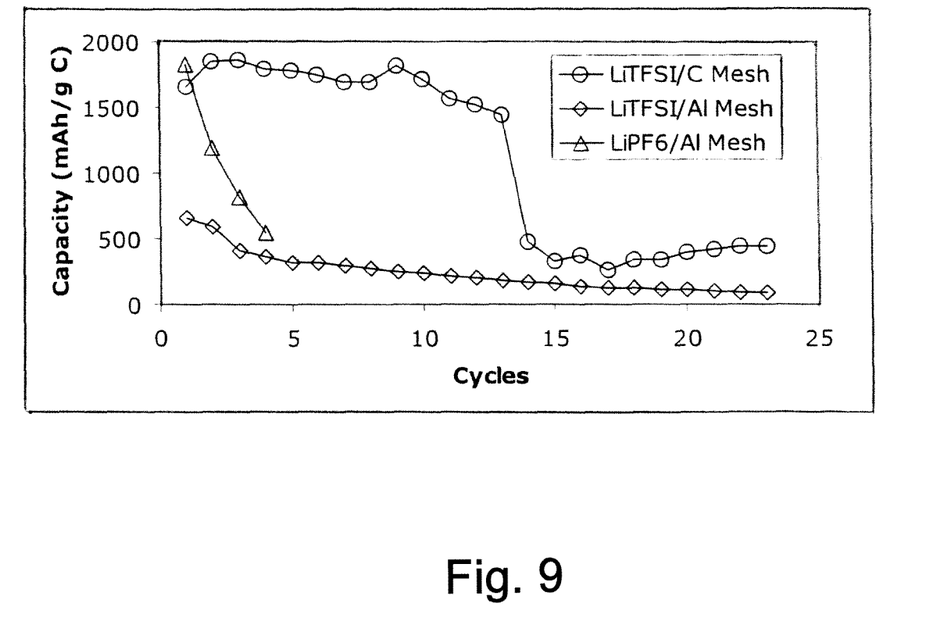
FIG. 9 is a table showing a comparison of batteries.

The combination of a carbon current collector with the lithium salt LiTFSI is believed to produce a battery with less capacity face on cycling. FIG. 9 shows a comparison of batteries that illustrates the improved capacity fade.

The increase in capacity results from the combination of the LiTFSI salt with the carbon cathode current collector 82. The LiTFSI does not form a passivating surface layer on an aluminum current collector, resulting in a sever corrosion of the aluminum during cycling when LiTFSI is used as the electrolyte salt, which leads to poor electrode/current collector contact which effects the capacity fading. However, the LiTFSI in combination with the carbon cathode current collector avoids the problems of a breakdown, catalyst degradation, or corrosion of the current collector. The carbon current collector surfaces do not require passivation to operate at voltages above 3.5 V., a problem especially prevalent with the prior art aluminum current collectors.

The battery cathode 83 is prepared from a slurry of carbon and a catalyst suspended in a solution of polymer binder. The slurry is milled to ensure thorough mixing and interparticle contacts. The cathode is formed by casting or depositing a first quantity of the slurry onto a polished glass surface to form a first layer of cathode material. A layer of carbon fabric 82 is they placed upon the cast cathode and a second quantity of slurry is then cast over the carbon fabric 82 to form a second layer of cathode material, thereby encasing the carbon fabric 82 which acts as a cathode current collector 82. It should be understood that the first and second layers of slurry mix or blend together, therefore the term layer is not intended to mean separate and distinct layer in the final cathode or cathode material. The casting is then wetted with a non-aqueous liquid electrolyte and placed in contact with a non-porous solid polymer lithium ion conductive separator membrane 87. Alternatively, the separator or separator membrane 87 may be made of a porous polypropylene membrane, such as that sold under the tradename Celgard.

A lithium metal anode 85 is then place on the opposite side of the separator 87 and pressed or bonded into a copper foil anode current collector 88. The assembled battery or cell is then placed into an enclosure that can be filled with oxygen or air and coupled to electrical leads so that the battery may be coupled to a load.

The cathode 83 of the battery may be prepared in the following manner, polyvinylidene fluoride (PVDF) is added to approximately 30 ml of acetone wherein the mixture is maintained under constant stirring and heat to approximately 50 degrees Celsius to dissolve the mixture to form a first solution. A carbon powder (carbon black), short carbon fibers 89, and a catalyst is then mixed into approximately 100 ml of acetone to form a second solution. The carbon powder or particles and the carbon fibers become randomly distributed throughout the cathode slurry and ultimately throughout the final cathode or cathode layer The first and second solutions are then mixed together to produce a cathode slurry. The cathode slurry is then ball milled for approximately 4.5 hours. The cathode slurry is then cast upon a clean glass surface and a carbon mesh is submerged into the cast slurry (as previously described with the process of casting in two layers). The cathode is then covered and allowed to dry for approximately 4 hours to form the final combination of cathode and cathode current collector.

The carbon current collector 82 may be a carbon cloth or fabric comprised on fibers of graphite, carbon black, carbon fibers, carbon nanotubes, carbon nanoparticles, glassy carbon, fullerenes or polyacrylonitrile. The carbon cathode current collector 82 (referred generally herein as carbon fabric or cloth herein) may be made of random, ordered, woven, nonwoven, compressed or uncompressed materials as well as a combination thereof to form a carbon mesh, carbon cloth, carbon yarn, carbon mat, carbon fiber or carbon paper. The typical area density, thickness and tensile strength of the carbon cathode current collector are on the order of 3-10 g/m$^2$, 1-5 mils and 2-30 lb/in respectively. The fibers of the carbon fabric preferably have a diameter of 3-10 micrometers. The randomly distributed carbon fibers preferably have a diameter of 3-30 micrometers and an preferably an average diameter of approximately 10 micrometers. Similarly, the carbon particles within the cathode material may be graphite, carbon black, carbon fibers, carbon nanotubes, carbon nanoparticles, glassy carbon, and fullerenes. The catalyst may be $CO_3O_4$, $MnO_2$, $Fe_3O_4$ or cobalt (II) phthalocyanine. The binder may be PVDF, PTFE, DBA, cellulose acetate, polyimide or PEO. The battery nonaqueous solvent may be 1,2-dimethoxyethane, propylene carbonate, ethylene carbonate, tetraglyme, diglyme, triglyme, tetrahydrofuran, polyethylene glycol, PEO-siloxane, diethyl carbonate, dimethyl carbonate, acetamide, or acetonitrile. The battery lithium salt may be lithium bis(trifluoromethane)sulfonamide, lithium bis(perfluoroethane)sulfonylimide, lithium trifluoromethanesulfonamide, lithium tris(trifluoromethanesulfonyl)methide, lithium perfluoroethyltrifluoroborate, lithium tris(perfluoroethyl)trifluorophosphate, lithium bis(oxalate)borate, or lithium tetra(perfluorophenyl)borate. The battery separator may be made of a polyimide, polypropylene, PVDF, PTFE, fiber glass, LLTO, LLZO, or UPON.

A cathode 83 formed in the just described manner contains a dual porosity network of pores, also referred to as a dual pore structure. The term dual porosity or dual pore structure is intended to denote that the cathode has large pores of a diameter size between 1 to 10 microns from which smaller submicron pores extend which have a diameter size of 100 nanometers or less. The large pores contain a large amount of free space to accommodate air therein while the smaller pores are generally filled with the non-aqueous electrolyte.

It is believed that a ratio of approximately 20.9% PVDF, 67.5% carbon, and 11.6% catalyst provides very good results for a combination cathode and cathode current collector. However, it should be understood that the ratios of these components as well as the acetone may be varied to provide slightly different results.

It should be understood that the separator 87 may be either the porous polypropelyne layer (Celgard) which was previously described or a non-porous layer.

It should be understood that the mass of randomly distributed carbon fibers aid in maintaining the structural integrity of the cathode while also allowing better conductivity through the cathode.

It thus is seen that a lithium air battery is now provided with a cathode having non volatile electrolyte and a separator based on a solid electrolyte that will prevent the passage of moisture but will allow the efficient passage of ions. It should of course be understood that many modifications may be made to the specific preferred embodiment described herein, in addition to those specifically recited herein, without departure from the spirit and scope of the invention as set forth in the following claims.

The invention claimed is:

1. A lithium oxygen battery comprising:
   a porous oxygen cathode comprising a catalyst, carbon powder, randomly distributed carbon fibers through said porous oxygen cathode, and a cathode current collector comprising a carbon cloth material encased in the cathode;
   a lithium based electrolyte distributed through said cathode;
   a lithium based anode, and
   a separator positioned between said cathode and said anode,
   wherein the porous cathode has a dual porosity network configuration comprising a network of large pores having a diameter size ranging between 1 to 10 microns from which extends a network of small pores having a diameter size of 100 nanometers or less in diameter.

2. The lithium oxygen battery of claim 1 wherein said separator is a non-porous solid polymer lithium ion conductive material.

3. The lithium oxygen battery of claim 1 wherein said lithium based anode is a lithium metal based anode.

4. The lithium oxygen battery of claim 1 wherein said lithium based electrolyte is selected from the group consisting of lithium bis(trifluoromethan)sulfonamide, lithium bis (perfluoroethane)sulfonylimide, lithium trifluoromethanesulfonamide, lithium tris(trifluoromethanesulfonyl)methide, lithium perfluoroethyltrifluoroborate, lithium tris(perfluoroethyl)trifluorophosphate, lithium bis(oxalate)borate, and lithium tetra(perfluorophenyl)borate.

5. The lithium oxygen battery of claim 1 wherein said lithium based electrolyte is a lithium bis(trifluoromethane) sulfonamide electrolyte.

6. The lithium oxygen battery of claim 1 wherein the carbon cloth material is selected from the group consisting of carbon mesh, carbon fabric, carbon yarn, carbon mat, and carbon paper.

7. A lithium oxygen battery comprising:
- a porous oxygen cathode comprising a catalyst, carbon powder, randomly distributed carbon fibers through said porous oxygen cathode, and a cathode current collector comprising a carbon cloth material embedded in the cathode;
- a lithium based electrolyte distributed through said cathode;
- a lithium based anode, and
- a separator positioned between said cathode and said anode, wherein the porous cathode has a dual porosity network configuration comprising a network of large pores having a diameter size ranging between 1 to 10 microns from which extends a network of small pores having a diameter size of 100 nanometers or less in diameter.

8. The lithium oxygen battery of claim 7 wherein said separator is a non-porous solid polymer lithium ion conductive material.

9. The lithium oxygen battery of claim 7 wherein said lithium based anode is a lithium metal based anode.

10. The lithium oxygen battery of claim 7 wherein said lithium based electrolyte is selected from the group consisting of lithium bis(trifluoromethan)sulfonamide, lithium bis(perfluoroethane)sulfonylimide, lithium trifluoromethanesulfonamide, lithium tris(trifluoromethanesulfonyl)methide, lithium perfluoroethyltrifluoroborate, lithium tris(perfluoroethyl)trifluorophosphate, lithium bis(oxalate)borate, and lithium tetra(perfluorophenyl)borate.

11. The lithium oxygen battery of claim 7 wherein said lithium based electrolyte is a lithium bis(trifluoromethane)sulfonamide electrolyte.

12. The lithium oxygen battery of claim 7 wherein the carbon cloth material is selected from the group consisting of carbon mesh, carbon fabric, carbon yarn, carbon mat, and carbon paper.

13. The lithium oxygen battery of claim 1 wherein the porous oxygen cathode is prepared by forming a slurry comprising the catalyst, carbon powder, carbon fibers, a binder, and a plasticizer, applying a first layer of the slurry onto a substrate, applying the cathode current collector on the first layer of the slurry, applying a second layer of the slurry on the cathode current collector, and removing the plasticizer to yield the porous oxygen cathode.

14. The lithium oxygen battery of claim 7 wherein the porous oxygen cathode is prepared by forming a slurry comprising the catalyst, carbon powder, carbon fibers, a binder, and a plasticizer, applying a layer of the slurry onto a substrate, submerging the cathode current collector into the layer of the slurry, and removing the plasticizer to yield the porous oxygen cathode.

* * * * *